United States Patent
Tang et al.

(10) Patent No.: US 11,900,626 B2
(45) Date of Patent: Feb. 13, 2024

(54) SELF-SUPERVISED 3D KEYPOINT LEARNING FOR EGO-MOTION ESTIMATION

(71) Applicant: TOYOTA RESEARCH INSTITUTE, INC., Los Altos, CA (US)

(72) Inventors: Jiexiong Tang, Stockholm (SE); Rares A. Ambrus, San Francisco, CA (US); Vitor Guizilini, Santa Clara, CA (US); Sudeep Pillai, Santa Clara, CA (US); Hanme Kim, San Jose, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 311 days.

(21) Appl. No.: 17/093,360

(22) Filed: Nov. 9, 2020

(65) Prior Publication Data
US 2021/0237764 A1 Aug. 5, 2021

Related U.S. Application Data

(60) Provisional application No. 62/968,883, filed on Jan. 31, 2020.

(51) Int. Cl.
*G06T 7/00* (2017.01)
*G06T 7/579* (2017.01)
(Continued)

(52) U.S. Cl.
CPC .......... *G06T 7/579* (2017.01); *B60W 60/001* (2020.02); *B60W 60/0027* (2020.02); *G06N 3/08* (2013.01);
(Continued)

(58) Field of Classification Search
CPC .......... B60W 60/001; B60W 60/0027; B60W 2420/42; G06T 7/579; G06T 7/269;
(Continued)

(56) References Cited

U.S. PATENT DOCUMENTS 11,341,614 B1 * 5/2022 Chen .................. G06T 3/4038
2010/0315505 A1 * 12/2010 Michalke ............ G06T 7/251
348/118
(Continued)

FOREIGN PATENT DOCUMENTS

CN 110335337 A 10/2019

OTHER PUBLICATIONS

Lowe, et al., "Object recognition from local scale-invariant features", ICCV, vol. 99, 1999, pp. 1150-1157.
(Continued)

*Primary Examiner* — Tyler J Lee
*Assistant Examiner* — Tiffany P Ohman
(74) *Attorney, Agent, or Firm* — SEYFARTH SHAW LLP

(57) ABSTRACT

A method for learning depth-aware keypoints and associated descriptors from monocular video for ego-motion estimation is described. The method includes training a keypoint network and a depth network to learn depth-aware keypoints and the associated descriptors. The training is based on a target image and a context image from successive images of the monocular video. The method also includes lifting 2D keypoints from the target image to learn 3D keypoints based on a learned depth map from the depth network. The method further includes estimating ego-motion from the target image to the context image based on the learned 3D keypoints.

15 Claims, 7 Drawing Sheets

(51) Int. Cl.

| | |
|---|---|
| *B60W 60/00* | (2020.01) |
| *G06T 7/246* | (2017.01) |
| *G06T 7/33* | (2017.01) |
| *G06T 7/269* | (2017.01) |
| *G06T 7/73* | (2017.01) |
| *G06N 3/08* | (2023.01) |
| *G06V 10/764* | (2022.01) |
| *G06V 10/82* | (2022.01) |
| *G06V 10/46* | (2022.01) |
| *G06V 20/56* | (2022.01) |
| *G06V 20/64* | (2022.01) |

(52) U.S. Cl.
CPC ............. *G06T 7/248* (2017.01); *G06T 7/269* (2017.01); *G06T 7/337* (2017.01); *G06T 7/75* (2017.01); *G06V 10/462* (2022.01); *G06V 10/764* (2022.01); *G06V 10/82* (2022.01); *G06V 20/56* (2022.01); *G06V 20/64* (2022.01); *B60W 2420/42* (2013.01); *G06T 2207/10016* (2013.01); *G06T 2207/10028* (2013.01); *G06T 2207/20081* (2013.01); *G06T 2207/30241* (2013.01); *G06T 2207/30248* (2013.01); *G06T 2207/30252* (2013.01)

(58) Field of Classification Search
CPC ........... G06T 7/75; G06T 7/337; G06T 7/248; G06T 2207/10016; G06T 2207/10028; G06T 2207/20081; G06T 2207/30241; G06T 2207/30248; G06T 2207/30252; G06V 10/40; G06N 3/08
USPC .......................................................... 701/25
See application file for complete search history.

(56) References Cited

U.S. PATENT DOCUMENTS

| | | | |
|---|---|---|---|
| 2019/0108651 A1 | 4/2019 | Gu et al. | |
| 2019/0147341 A1 | 5/2019 | Rabinovich et al. | |
| 2019/0295282 A1 | 9/2019 | Smolyanskly et al. | |
| 2020/0098135 A1* | 3/2020 | Ganjineh | G06F 16/29 |

OTHER PUBLICATIONS

Sarlin, et al., "From Coarse to Fine: Robust Hierarchical Localization at Large Scale", IEEE Conference on Computer Vision and Pattern Recognition (CVPR), Jun. 2019.

Yin, et al., "GeoNet: Unsupervised Learning of Dense Depth", IEEE Conference on Computer Vision and Pattern Recognition (CVPR0, 2018.

Zhou, et al., "Unsupervised Learning of Monocular Depth Estimation with Bundle Adjustment, Super-Resolution and Clip Loss", arXiv:1812.03368, 2018.

Zhou, et al., "Unsupervised Learning of depth and ego-motion from video", IEEE Conference on Computer Vision and Pattern Recognition (CVPR), vol. 2, p. 7, 2017.

Zou, et al., "DF-Net: Unsupervised Joint Learning of Depth and Flow using Cross-Task Consistency", European Conference on Computer Vision (ECCV), 2018.

Mahmud, et al., "ViewSynth: Learning Local Features from Depth using View Synthesis", arXiv:1911.10248v1, Nov. 22, 2019.

Lowe, Davd G., "Distinctive image features from scale-invariant keypoints", International Journal of Computer Vision, 60(2):91-110, 2004.

Detone, et al., "Superpoint: Self-supervised interest point detection and description", In Proceedings of the IEEE Conference on Computer Vision and Pattern Recognition Workshops, pp. 224-236, 2018.

Christiansen, et al., "UnsuperPoint: End-to-end Unsupervised Interest Point Detector and Descriptor", arXiv preprint arXiv:1907.04011, 2019.

Yi, et al., "LIFT: Learned invariant feature transform", In Computer Vision—ECCV 2016, Lecture Notes in Computer Science, pp. 467-483. Springer, Cham, Oct. 2016.

Ono, et al., "LF-Net: Learning local features from images", In S Bengio, H Wallach, H Larochelle, K Grauman, N Cesa-Bianchi, and R Garnett, editors, Advances in Neural Information Processing Systems 31, pp. 6234-6244. Curran Associates, Inc., 2018.

Detone, et al., "Self-Improving Visual Odometry", CoRR, vol. abs/1812.03245, 2018.

Tang, et al., "Neural Outlier Rejection for Self-Supervised Keypoint Learning", Submitted to International Conference on Learning Representations, 2020.

Godard, et al., "Digging into self-supervised monocular depth estimation," arXiv:1806.01260, 2018.

Pillai, et al., "Superdepth: Self-Supervised, Super-Resolved Monocular Depth Estimation", arXiv:1810.01849, 2018.

Guizilini, et al., "PackNet-SfM: 3D Packing for Self-Supervised Monocular Depth Estimation", arXiv:1905.02693, 2018.

Agarwal, et al., "Bundle Adjustment in the Large", European Conference on Computer Vision, pp. 29-42, Springer, 2010.

Ambrus, et al., "Two stream networks for self-supervised ego-motion estimation", arXiv:1910.01764, 2019.

Balntas, et al., "HPatches: A benchmark and evaluation of hand-crafted and learned local descriptors", Proceedings.

Bian, et al., "Unsupervised Scale-consistent Depth and Ego-motion Learning from Monocular Video", arXiv:1908.10553, 2019.

Cadena, et al., "Past, present, and future of simultaneous localization and mapping: Toward the robust-perception age", IEEE Tranactions on robotics, 32(6):1309-1332, 2016.

Deng, et al., "ImageNet: a Large-Scale Hierarchical Image Database", In 2009 IEEE Computer Society Conference on Computer Vision and Pattern Recognition (CVPR 2009), Jun. 20-25, 2009, Miami, Florida, USA.

Fu, et al., "Deep ordinal regression network for monocular depth estimation", In Proceedings of the IEEE Conference on Computer Vision and Pattern Recognition, pp. 2002-2011, 2018.

Geiger, et al., "Stereoscan: Dense 3D Reconstruction in Real-Time", In Intelligent Vehicles Symposium (IV), 2011 IEEE, pp. 963-968, 2011.

Gordon, et al., "Depth From Videos in the Wild: Unsupervised Monocular Depth Learning from Unknown Cameras", Proceedings of the IEEE/CVF International Conference on Computer Vision (ICCV), 2019, pp. 8977-8986.

Jaderberg, et al., "Spatial Transformer Networks", In Advances in Neural Information Processing Systems 28 (NIPS), 2015.

Kirillov, et al., "Panoptic Feature Pyramid Networks", In Proceeding of the IEEE Conference on Computer Vision and Pattern Recognition, pp. 6399-6408, 2019.

Kolesnikov, et al., "Revisiting Self-Supervised Visual Representation Learning", arXiv:1901.09005, 2019.

Lang, et al., "Pointpillars: Fast encoders for object detectionfrom point clouds", In Proceedings of the IEEE Conference on Computer Vision and Pattern Recognition, pp. 12697-12705, 2019.

Lepetit, et al., "EPnP: An Accurate O(n) Solution to the PnP Problem", Int J Comput Vis 81, 155 (2009).

Li, et al., "Lear ning to Fuse Things and Stuff", arXiv:1812.01192, 2018.

Li, et al., "Undeepvo Monocular visual odometry through unsupervised deep learning", arXiv:1709.06841, 2017.

Li, et al., "LO-Net: Deep Real0time Lidar Odometry", 2019 IEEE/CVF Conference on Computer Vision and Pattern Recognition (CVPR), Jun. 2019.

Luo, et al., "Every Pixel Counts++: Joint Learning of Geometry and Motion with 3D Holistic Understanding", arXiv:1810.06125, 2018.

Mahjourian, et al., "Unsupervised learning of depth and ego-motion from monocular video using 3D geometric constraints", 2018 IEEE/CVF Conference on Computer Vision and Pattern Recognition (CVPR), 2018.

(56) References Cited

OTHER PUBLICATIONS

Mur-Artal, et al., "Orb-slam2: An open source slam system for monocular, stereo, and rgb-d cameras", IEEE Transactions on Robotics, 33(5): 1255-1262, 2017.
Rublee, et al., "ORB: an efficient alternative to Sift or Surf", IEEE International Conference on Computer Vision, ICCV 2011, Barcelona, Spain, Nov. 6-13, 2011.
Savinov, et al., "Quad-Networks: Unsupervised Learning to Rank for Interest Point Detection", In the IEEE Conference on Computer Vision and Pattern Recognition (CVPR), Jul. 2017.
Sun, et al., "Deep High-Resolution Representation Learning for Human Pose Estimation", 2019 IEEE/CVF Conference on Computer Vision and Pattern Recognition (CVPR), 2019, pp. 5686-5696.
Teed, et al., "Deepv2d: video to depth with differentiable structure from motion", International Conference on Learning Representations, 2020.
Tian, et al., "FCOS: Fully Convolutional One-Stage Object Detection", Proceedings of the IEEE/CVF International Conference on Computer Vision (ICCV), 2019, pp. 9627-9636.
Velas, et al., "CNN for IMU assisted odometry estimation using velodyne LiDAR", 2018 IEEE International Conference on Autonomous Robot Systems and Competitions (ICARSC), Apr. 2018.
Verdie, et al., "Tilde: A Temporally Invariant Learned DEtector", 2015 IEEE Conference on Computer Vision and Pattern Recognition (CVPR), Jun. 7-12, 2015.
Vondrick, et al., "Tracking Emerges by Colorizing Videos", arXiv:1806.09594, Proceedings of the European Conference on Computer Vision (ECCV), 2018, pp. 391-408.
Wang, et al., "DeepVO: Towards End-to-End Visual Odometry with Deep Recurrent Convolutional Neural Networks", 2017 IEEE International Conference on Robotics and Automation (ICRA), 2017.
Wang, et al., "Learning Correspondence From the Cycle-Consistency of Time", 2019 IEEE/CVF Conference on Computer Vision and Pattern Recognition (CVPR), 2019, pp. 2561-2571.
Wang, et al., "Learning Depth from Monocular Videos using Direct Methods", 2018 IEEE/CVF Conference on Computer Vision and Pattern Recognition, 2018, pp. 2022-2030.
Wang, et al., "Image quality assessment: from error visibility to structural similarity", IEEE Transactions on Image Processing, vol. 13, No. 4, pp. 600-612, Apr. 2004.
Yang, et al. "Deep Virtual Stereo Odometry: Leveraging Deep Depth Prediction for Monocular Direct Sparse Odometry." 2018 European Conference on Computer Vision (ECCV), 2018, pp. 835-852.
Zhang, et al., "Low-drift and Real-time Lidar Odometry and Mapping", Journal Article, Autonomous Robots, vol. 41, No. 2, Feb. 2017, pp. 401-416.
Zhu, et al., "Robustness Meets Deep Learning: An End-to-End Hybrid Pipeline for Unsupervised Learning of Egomotion", arXiv1812.08351, 2018.
Engel, et al., "Direct Sparse Odometry", IEEE Transactions on Pattern Analysis and Machine Intelligence 40, 2018, pp. 611-625.
Eigen, et al., "Depth Map Prediction froma Single Image Using a Multi-Scale Deep Network", Advances in Neural Information Processing Systems (NIPS), 40(3), 2014, pp. 2366-2374.
Godard, et al., "Unsupervised monocular depth estimation with left-right consistency", CVPR, vol. 2, 2017, p. 7.
Kurnietsov, et al., "Semi-Supervised Deep Learning for Monocular Depth Map Prediction", IEEE Conference on Computer Vision and Pattern Recognition, 2017, pp. 6647-6655.
Mahmud, et al., "Viewsynth: Learning Local Features From Depth Using View Synthesis", Ground AI, Nov. 22, 2019.

* cited by examiner

SELF-SUPERVISED 3D KEYPOINT LEARNING FOR EGO-MOTION ESTIMATION

CROSS-REFERENCE TO RELATED APPLICATION

The present application claims the benefit of U.S. Provisional Patent Application No. 62/968,883, filed on Jan. 31, 2020, and titled "SELF-SUPERVISED 3D KEYPOINT LEARNING FOR EGO-MOTION ESTIMATION," the disclosure of which is expressly incorporated by reference in its entirety.

BACKGROUND

Field

Certain aspects of the present disclosure generally relate to machine learning and, more particularly, a system and method for self-supervised 3D keypoint learning for ego-motion estimation.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. Detecting interest points in RGB images and matching them across views is a fundamental capability of many robotic systems. Unfortunately, conventional autonomous systems assume that salient keypoints can be detected and re-identified in diverse settings, which involves strong invariance to lighting, viewpoint changes, scale, etc. Until recently, these tasks have mostly relied on hand-engineered keypoint features, which have limited performance. That is, generating reliable illumination and viewpoint invariant keypoints is desired for ego-motion estimation.

SUMMARY

A method for learning depth-aware keypoints and associated descriptors from monocular video for ego-motion estimation is described. The method includes training a keypoint network and a depth network, and to learn depth-aware keypoints and the associated descriptors. The training is based on a target image and a context image from successive images of the monocular video. The method also includes lifting 2D keypoints from the target image to learn 3D keypoints based on a learned depth map from the depth network. The method further includes estimating ego-motion from the target image to the context image based on the learned 3D keypoints.

A non-transitory computer-readable medium having program code recorded thereon for learning depth-aware keypoints and associated descriptors from monocular video for ego-motion estimation is described. The program code is executed by a processor. The non-transitory computer-readable medium includes program code to train a keypoint network and a depth network to learn the depth-aware keypoints and the associated descriptors. The training is based on a target image and a context image from successive images of the monocular video. The non-transitory computer-readable medium also includes program code to lift 2D keypoints from the target image to learn 3D keypoints based on a learned depth map from the depth network. The non-transitory computer-readable medium further includes program code to estimate ego-motion from the target image to the context image based on the learned 3D keypoints.

A system for learning depth-aware keypoints and associated descriptors from monocular video for ego-motion estimation is described. The system includes a depth-aware keypoint model trained to learn a keypoint network and a depth network, and trained to learn depth-aware keypoints and associated descriptors. The training is based on a target image and a context image from successive images of a monocular video. The system also includes a keypoint lifting module to lift 2D keypoints from the target image to learn 3D keypoints based on a learned depth map from the depth network. The system further includes an ego-motion estimation module to estimate ego-motion from the target image to the context image based on the learned 3D keypoints.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
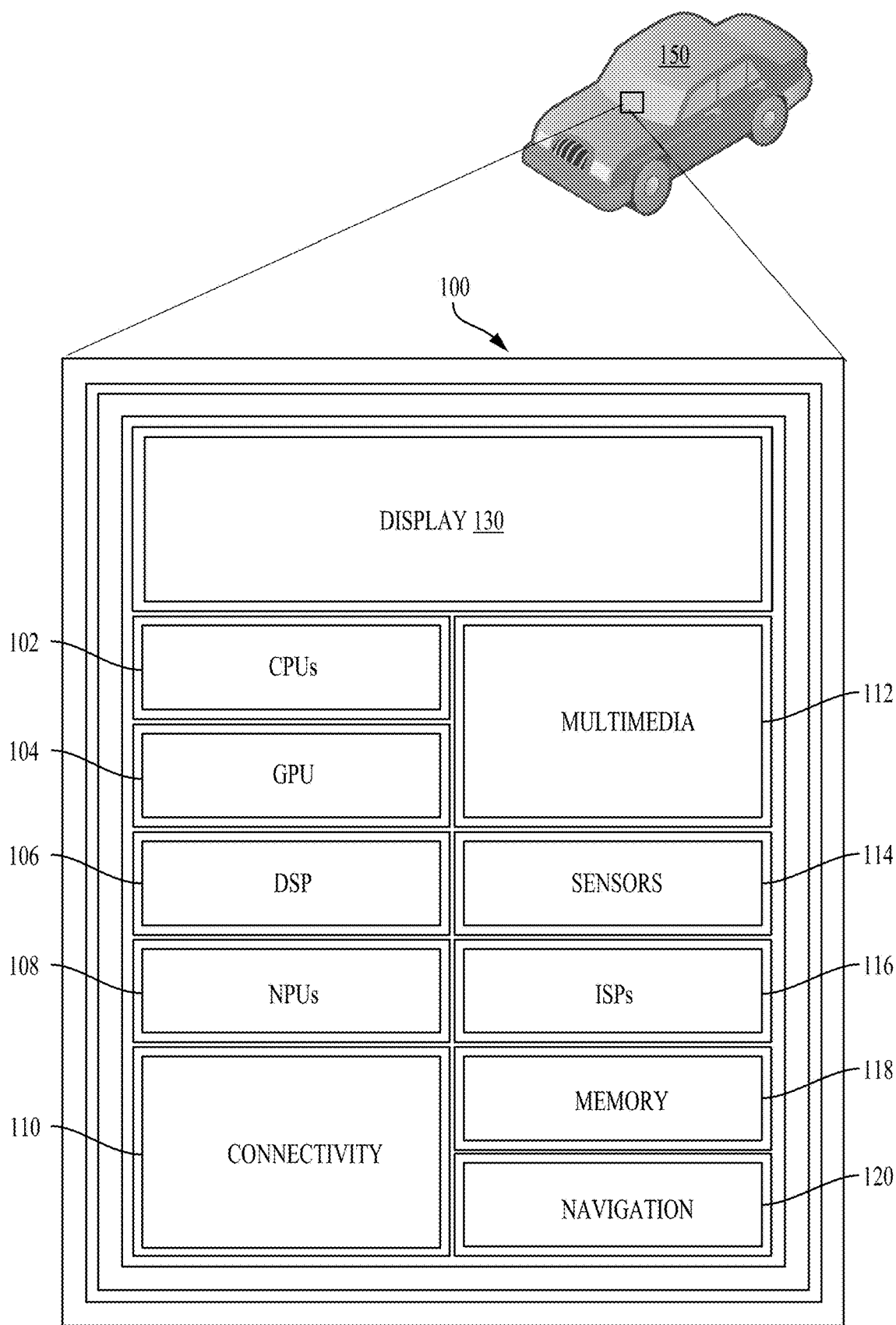
FIG. 1 illustrates an example implementation of designing a system using a system-on-a-chip (SOC) for ego-motion estimation, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Visual odometry and ego-motion estimation are important perception tasks in the area of autonomous agents, such as driverless cars and robots, which are quickly evolving and have become a reality in this decade. Detecting interest points in RGB images and matching them across views is a fundamental capability of many robotic systems. Tasks such as structure-from-motion (SfM), visual odometry (VO), or simultaneous localization and mapping (SLAM) assume that salient keypoints can be detected and re-identified in diverse settings, which involves strong invariance to lighting, viewpoint changes, scale, etc. Until recently, these tasks have mostly relied on hand-engineered keypoint features, which have limited performance. That is, generating reliable illumination and viewpoint invariant keypoints is critical for feature-based SLAM and SfM.

State-of-the-art learning-based methods often rely on generating training samples by employing homography adaptation to create 2D synthetic views. While such approaches trivially solve data association between views, they cannot effectively learn from real illumination and non-planar 3D scenes. Deep learning, however, has recently revolutionized many computer vision applications in the supervised setting. Unfortunately, these methods rely on strong supervision in the form of ground-truth labels that are often expensive to acquire. Moreover, supervising interest point detection is unnatural, as a human annotator cannot readily identify salient regions in images as well as key signatures or descriptors, which would allow their re-identification in diverse scenarios.

Aspects of the present disclosure include a method of self-supervised learning of depth-aware keypoints from unlabeled videos by incorporating a differentiable pose estimation module. In aspects of the present disclosure, the differentiable pose estimation module jointly optimizes the keypoints and their depths in a structure-from-motion (SfM) setting. In addition, a 3D multi-view adaptation technique that exploits the temporal context in videos to self-supervise keypoint detection and matching in an end-to-end differentiable manner is described.

FIG. 1 illustrates an example implementation of the aforementioned system and method for ego-motion estimation using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for ego-motion estimation in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
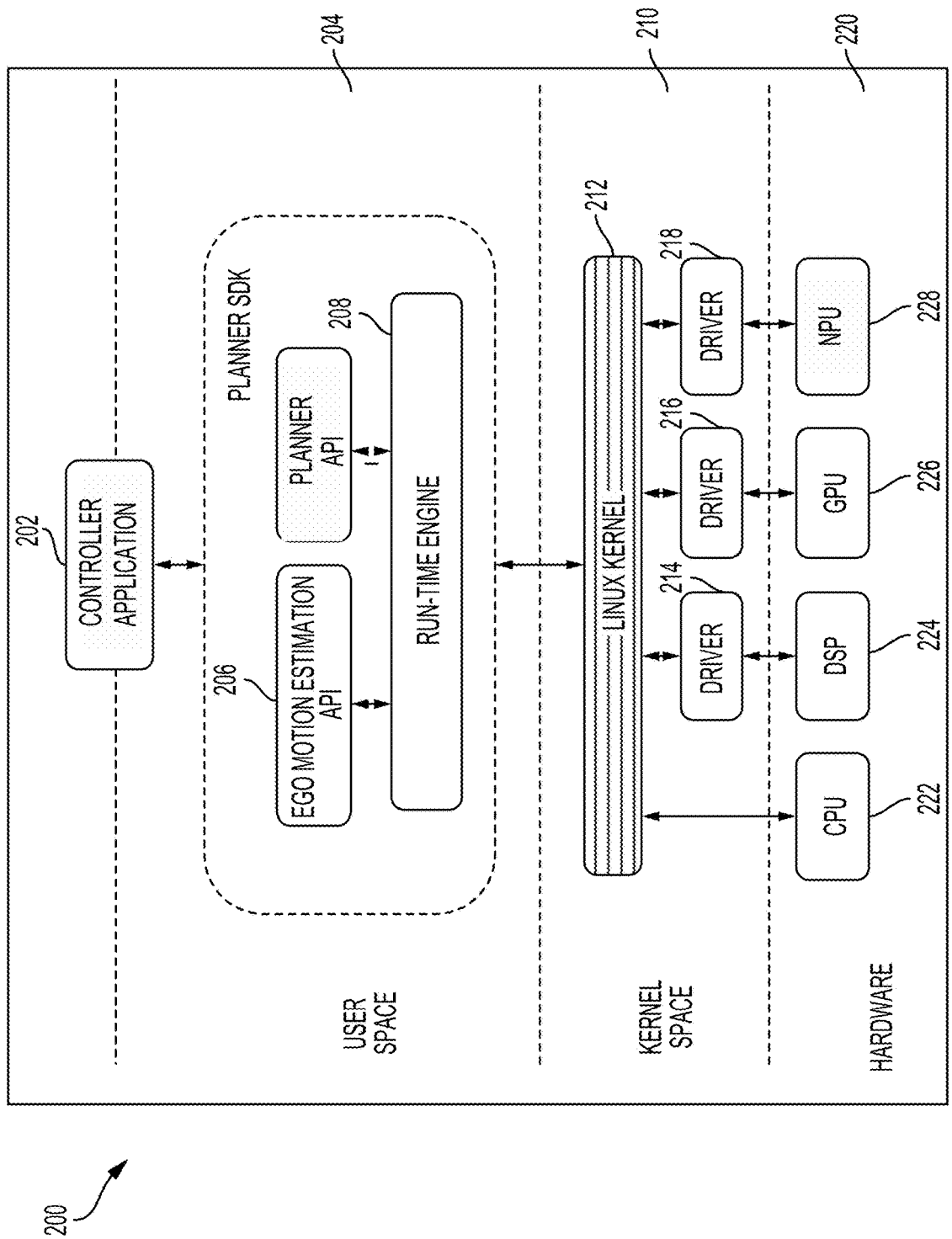
FIG. 2 is a block diagram illustrating a software architecture that may modularize functions for ego-motion estimation, according to aspects of the present disclosure.

FIG. 2 is a block diagram illustrating a software architecture 200 that may modularize functions for planning and control of an ego vehicle for ego-motion estimation, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, provide for ego-motion estimation from video captured by a monocular camera of an ego vehicle. The controller application 202 may make a request to compile program code associated with a library defined in an ego-motion estimation application programming interface (API) 206 for monocular depth-aware keypoint learning for the task of ego-motion estimation.

A run-time engine 208, which may be compiled code of a runtime framework, may be further accessible to the controller application 202. The controller application 202 may cause the run-time engine 208, for example, to perform monocular (single-camera) 3D detection. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
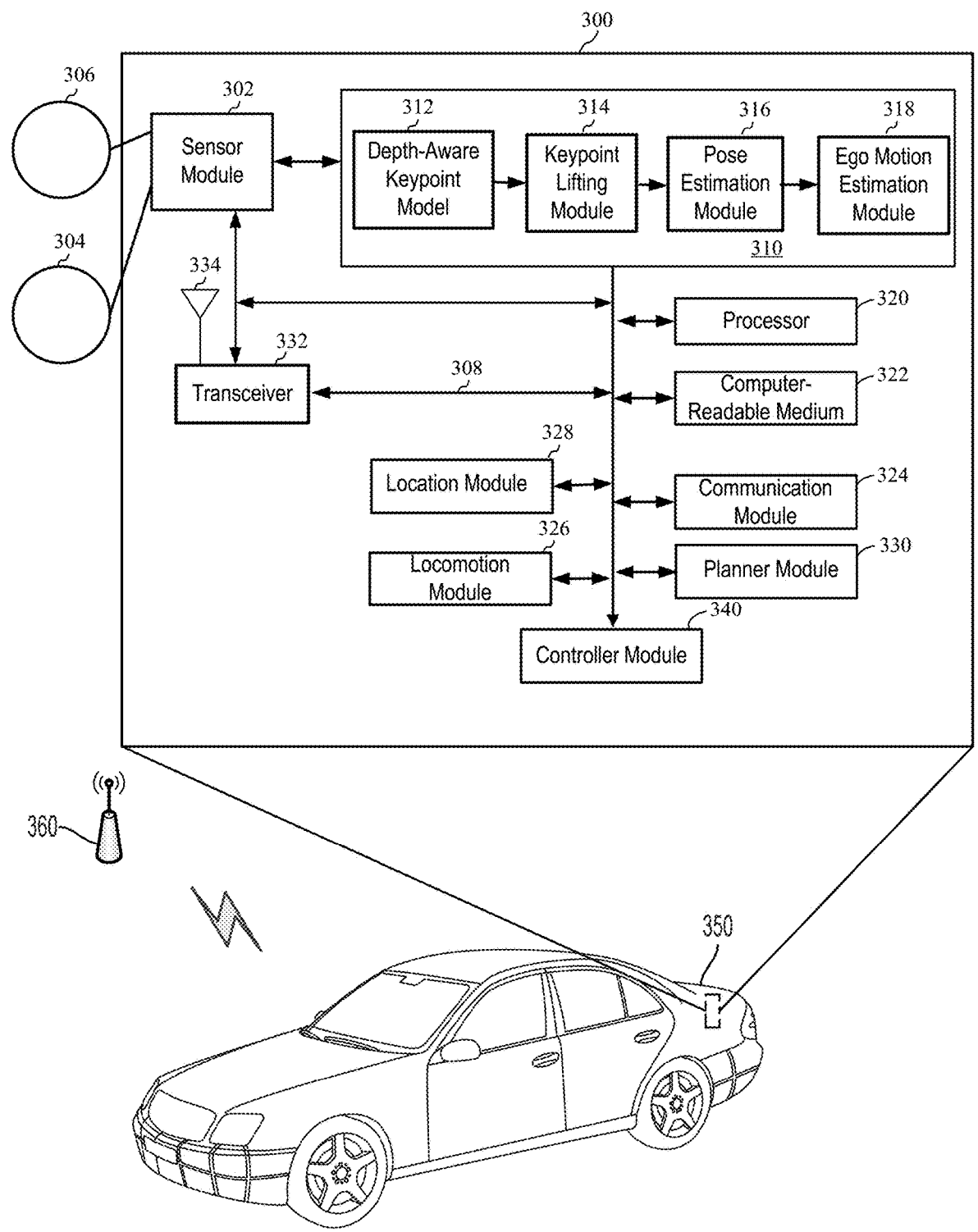
FIG. 3 is a diagram illustrating an example of a hardware implementation for an ego-motion estimation system, according to aspects of the present disclosure.

FIG. 3 is a diagram illustrating an example of a hardware implementation for a monocular ego-motion estimation system 300, according to aspects of the present disclosure. The monocular ego-motion estimation system 300 may be configured for planning and control of an ego vehicle in response to monocular (single-camera) ego-motion estimation during operation of a car 350. The monocular ego-motion estimation system 300 may be a component of a vehicle, a robotic device, or other device. For example, as shown in FIG. 3, the monocular ego-motion estimation system 300 is a component of the car 350. Aspects of the present disclosure are not limited to the monocular ego-motion estimation system 300 being a component of the car 350, as other devices, such as a bus, motorcycle, or other like vehicle, are also contemplated for using the monocular ego-motion estimation system 300. The car 350 may be autonomous or semi-autonomous.

The monocular ego-motion estimation system 300 may be implemented with an interconnected architecture, represented generally by an interconnect 308. The interconnect 308 may include any number of point-to-point interconnects, buses, and/or bridges depending on the specific application of the monocular ego-motion estimation system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The monocular ego-motion estimation system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The monocular ego-motion estimation system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the monocular ego-motion estimation system 300 to perform the various functions described for ego vehicle perception based on monocular ego-motion estimation from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

Detecting interest points in RGB images and matching them across views is a fundamental capability of many robotic systems as well as the area of autonomous driving, such as autonomous operation of the car 350. Tasks such as structure-from-motion (SfM), visual odometry (VO), or simultaneous localization and mapping (SLAM) assume that salient keypoints can be detected and re-identified in diverse settings, which involves strong invariance to lighting, viewpoint changes, scale etc. Until recently, these tasks have mostly relied on hand-engineered keypoint features, which have limited performance. That is, generating reliable illumination and viewpoint invariant keypoints is critical for feature-based SLAM and SfM.

State-of-the-art learning-based methods often rely on generating training samples by employing homography adaptation to create 2D synthetic views. While such approaches trivially solve data association between views, they cannot effectively learn from real illumination and non-planar 3D scenes. Deep learning, however, has recently revolutionized many computer vision applications in the supervised setting. Unfortunately, these methods rely on strong supervision in the form of ground-truth labels that are often expensive to acquire. Moreover, supervising interest point detection is unnatural, as a human annotator cannot readily identify salient regions in images as well as key signatures or descriptors, which would allow their re-identification in diverse scenarios.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the monocular ego-motion estimation system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The monocular ego-motion estimation system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

As shown in FIG. 3, the ego perception module 310 includes a depth-aware keypoint model 312, a keypoint lifting module 314, a pose estimation module 316, and an ego-motion estimation module 318. The depth-aware keypoint model 312, the keypoint lifting module 314, the pose estimation module 316, and the ego-motion estimation module 318 may be components of a same or different artificial neural network, such as a deep convolutional neural network (CNN) backbone. The ego perception module 310 is not limited to a deep CNN backbone. The ego perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

The ego perception module 310 is configured to perform monocular depth-aware keypoint learning for the task of ego-motion estimation from monocular RGB images received from the first sensor 304 or the second sensor 306 for autonomous operation of the car 350. According to aspects of the present disclosure, the depth-aware keypoint model 312 is configured to perform self-supervised learning of depth-aware keypoints from unlabeled videos by incorporating the pose estimation module 316 (e.g., a differentiable pose estimation module). In aspects of the present disclosure, the pose estimation module 316 jointly optimizes the keypoints and their depths in a structure-from-motion (SfM) setting. In addition, the multi-view adaptation module exploits the temporal context in videos to self-supervise keypoint detection and matching in an end-to-end differentiable manner.

In this aspect of the present disclosure, depth-aware keypoint model 312 models a fully self-supervised framework for monocular depth-aware keypoint learning for the task of ego-motion estimation. This aspect of the present disclosure perform depth-aware keypoint learning purely from watching large volumes of unlabeled videos, without any need for supervision in the form of ground-truth or pseudo ground-truth labels. As a result of learning the 2D-to-3D key-point lifting function from monocular videos, the 2D-to-3D key-point lifting function may be used to accurately estimate the ego-motion between temporally adjacent images, as shown in FIGS. 4A-4B.

Figure 4A:
FIGS. 4A-4B show drawings illustrating self-supervised 3D depth-aware keypoints for ego-motion estimation, according to aspects of the present disclosure.
Figure 4B:
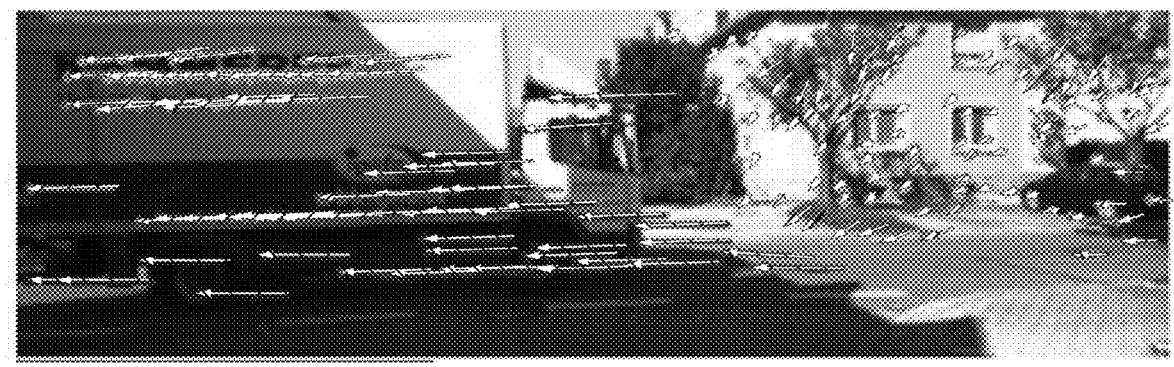

FIGS. 4A-4B show drawings illustrating self-supervised 3D depth-aware keypoints for ego-motion estimation, according to aspects of the present disclosure. FIG. 4A illustrates an unlabeled monocular video scene 400 with matched sparse flow. According to aspects of the present disclosure, self-supervised learning of 3D keypoints is performed from unlabeled monocular videos, such as the unlabeled monocular video scene 400 with matched sparse-flow. As described, matched parse flow refers to finding corresponding points between two images from an image sequence.

FIG. 4B illustrates a monocular video scene 420 with matched sparse-flow. FIGS. 4A and 4B illustrate a fully self-supervised approach that exploits the temporal context in videos to learn to extract accurate and robust 3D keypoints from a single monocular image. In aspects of the present disclosure, structured pose estimation with 3D keypoints enables handling of dynamic objects through outlier rejection, as shown in FIG. 5.

Figure 5:
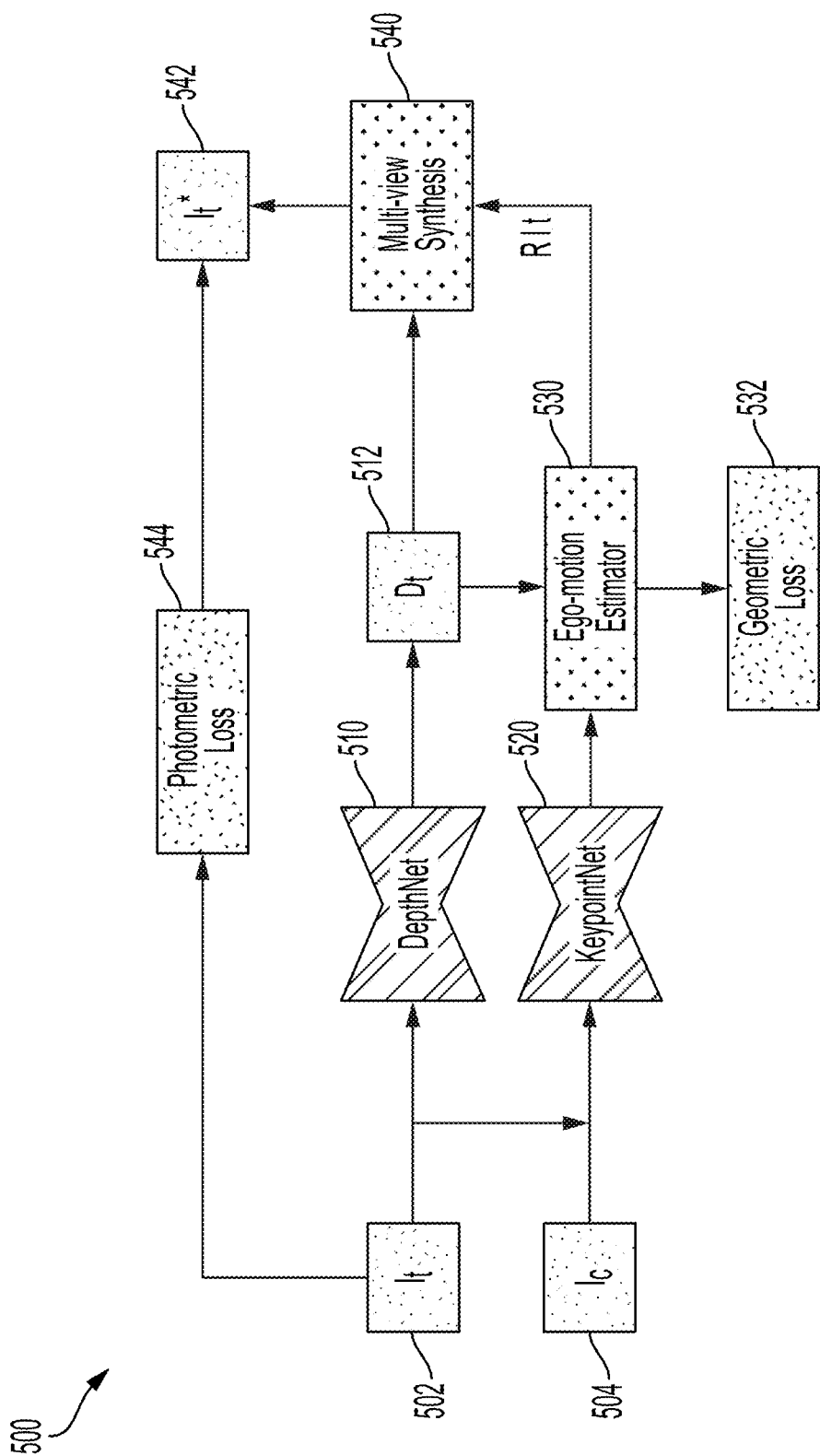
FIG. 5 is a block diagram illustrating a monocular keypoint learning system for monocular ego-motion estimation, according to aspects of the present disclosure.

FIG. 5 is a block diagram illustrating a monocular keypoint learning framework 500 for monocular ego-motion estimation, according to aspects of the present disclosure. In one aspect of the present disclosure, the monocular keypoint learning framework 500 is used to implement the ego perception module 310 shown in FIG. 3 using, for example, a structure-from-motion (SfM)-based configuration.

In one configuration, the monocular keypoint learning framework 500 receives two consecutive images, a target image (I t) 502 and a context image (L) 504 of a monocular video. In this configuration, the target image $I_t$ 502 is provided as input to a depth network (DepthNet 510), which outputs a predicted dense depth map (e.g., $D_t$ 512), and the context image $I_c$ 504 is provided as input to a keypoint network (KeypointNet 520). For example, the DepthNet 510 may be implemented using a ResNet18 encoder followed by a decoder which outputs inverse depth at 4 scales.

In aspects of the present disclosure, two consecutive images (e.g., the target image $I_t$ 502 and the context image $I_c$ 504) are used as input to self-supervise 3D keypoint learning using the ego-motion estimator 530. In this configuration, the DepthNet 510 and the KeypointNet 520 are simultaneously trained in an end-to-end process using a combination of the photometric loss block 544, the geometric loss block 532, and the multi-view synthesis block 540. The monocular keypoint learning framework 500 provides 3D keypoint estimation for long-term ego-motion estimation using a synthesized target image $I_t^*$ 542.

1. Self-Supervised 3D Keypoint Learning for Ego-Motion Estimation

As shown in FIG. 5, the monocular keypoint learning framework 500 is configured to perform depth-aware keypoint learning purely from watching large volumes of unlabeled videos, without any need for supervision in the form of ground-truth or pseudo ground-truth labels. According to aspects of the present disclosure, this training also learns a 2D-to-3D key-point lifting function from the monocular videos, which is additionally used to accurately estimate the ego-motion between temporally adjacent images. The monocular keypoint learning framework 500 is described in further detail below.

1.1 Notation

According to aspects of the present disclosure, monocular depth-aware keypoint learning may be formulated as follows. Given an input monocular image I, keypoint locations p, descriptors f, and scores s are regressed along with a dense depth map D. Functionally, three components are defined in the monocular keypoint learning framework 500 that are used to enable depth-aware keypoint learning in an end-to-end differentiable setting: (i) KeypointNet $f_p$: I→k={p, f, s} that learns to regress N output keypoint locations $p \in \mathbb{R}^{2 \times N}$, descriptors $f \in \mathbb{R}^{256 \times N}$ and scores $s \in \mathbb{R}^N$ given an input image $I \in \mathbb{R}^{3 \times H \times W}$; (ii) DepthNet $f_D$: I→D, that learns to predict the scale-ambiguous dense depth map $D = f_D(I)$, and as a result, provides a mechanism to lift the sparse 2D keypoints $p \in \mathbb{R}^{2 \times N}$ to 3D by directly sampling from the predicted dense depth D, $p^d = \pi^{-1}(p, D_t(pt))$: and (iii) a fully-differentiable ego-motion estimator $f_x(I_c, I_t) = x_{t \to c} = (R\ t\ 0\ 1\text{-}) \in \mathbb{SE}(3)$, that predicts the relative six degrees of freedom (6-DoF) rigid-body transformation between the target image $I_t$ 502 and the context image $I_c$ 504. As described herein, $p_{t \to c}$ is used to denote the warped keypoints $p_t$ from the target image $I_t$ 502 to the context image $I_c$ 504 via the transformation $x_{t \to c}$.

Aspects of the present disclosure compute the depth at multiple scales during training; however, when referring to the associated sparse depth for a set of descriptors, the depth from the scale with the highest resolution is used. As should be recognized, in the monocular SfM setting, the depth scale is ambiguous up to an unknown scale factor.

1.2 Self-Supervised Depth-Aware Keypoint Learning

In aspects of the present disclosure, the monocular keypoint learning framework 500 leverages geometric transformations to self-supervise and boost keypoint learning by relying on the multi-view synthesis block 540. In one configuration, the multi-view synthesis block 540 leverages epipolar constraints in two-view camera geometry for robust 3D keypoint learning. That is, the multi-view synthesis block 540 is configured for self-supervised 3D keypoint learning that leverages the structured geometry of scenes in unlabeled monocular videos. For example, computed warped keypoints in the context image (e.g., $I_c$ 504) corresponding to the determined keypoints from the target image (e.g., $I_t$ 502) according to a nearest keypoint in the target image (e.g., $I_t$ 502), as illustrated in FIG. 6.

Figure 6:
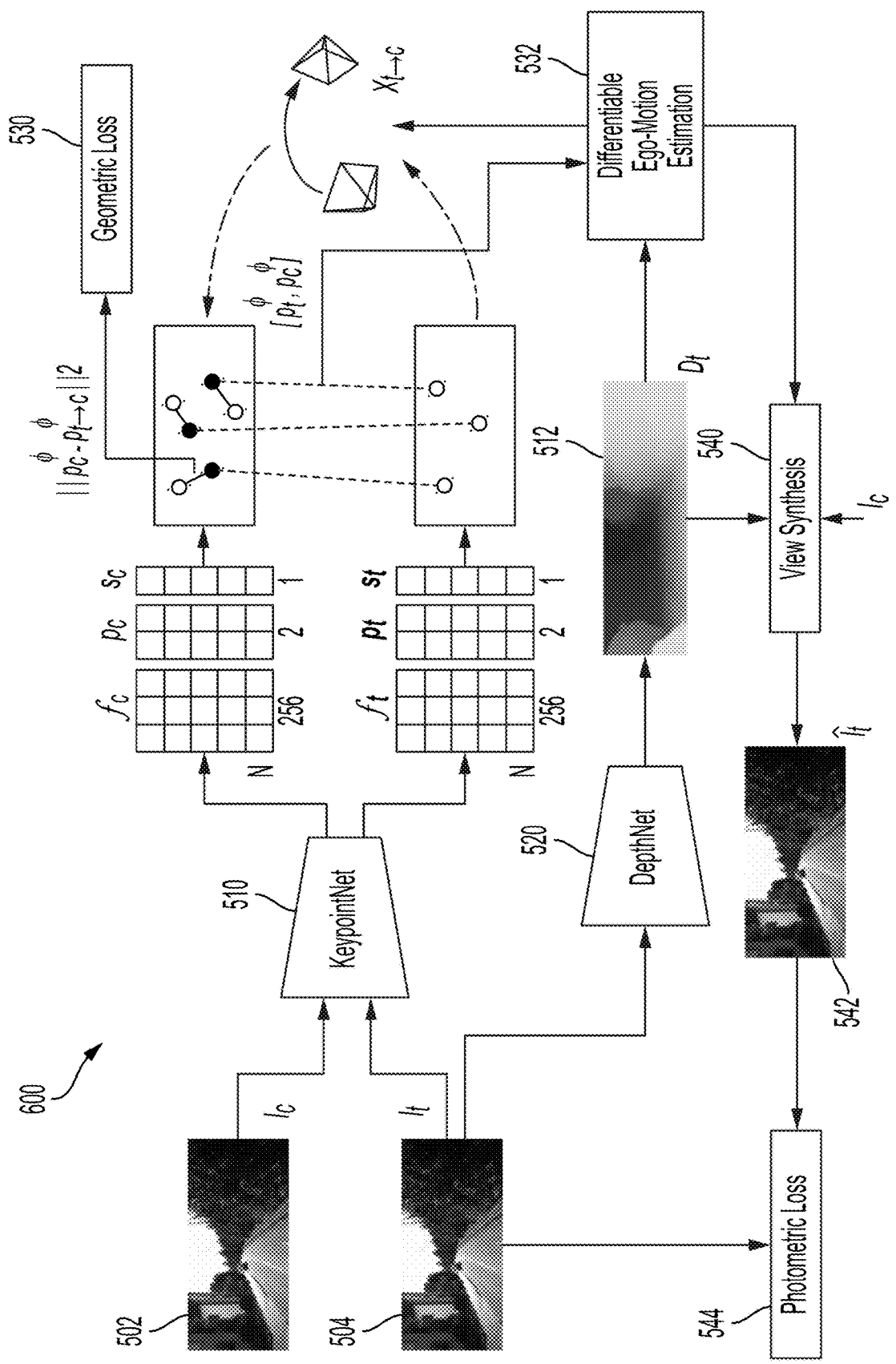
FIG. 6 illustrates a monocular structure-from-motion (SfM)-based 3D keypoint learning, according to aspects of the present disclosure.

FIG. 6 illustrates a monocular structure-from-motion (SfM)-based 3D keypoint learning 600, according to aspects of the present disclosure. The monocular SfM-based 3D keypoint learning 600 provides a comparison between a homographic adaptation and self-supervised depth-aware keypoint learning, according to aspects of the present disclosure. In an adaptation step, a set of corresponding keypoints is computed: $p_t^\Phi \leftrightarrow p_t^*$ (e.g., $p_t^\Phi$ from target image $I_t$ 602 along with $p_c^\Phi$ in the context image $I_c$ 604). In this configuration, predicted descriptors $f_t$ and $f_c$ in the target and context images are used to compute $p_c^\Phi$ via reciprocal matching in a descriptor space. For example, given the set of corresponding keypoints $p_t^\Phi \leftrightarrow p_c^\Phi$, the associated ego-motion $x_{t \to c}$ (see Section 1.3) is computed. Once the associated ego-motion $x_{t \to c}$ is known, the corresponding keypoint $p_t$ is computed using the ego-motion estimator 530. For example, the corresponding keypoint $p_t$ is computed by warping $p_t$ and inducing a combination of dense photometric loss (e.g., photometric loss block 544) via image-synthesis (e.g., multi-view synthesis block 540) and sparse geometric losses (e.g., geometric loss block 532).

In multi-view adaptation 650, the corresponding keypoint $p_t$ is computed via re-projection in a monocular two-view setting. This example uses: (i) a dense photometric loss based on the warped projection of $D_t$ in $I_s$ aimed at optimizing the dense depth prediction by the DepthNet 510; and (ii) a sparse geometric loss aimed at minimizing the re-projection error between corresponding keypoints $k_s^d$ and $k_t^d$ predicted by the KeypointNet 520.

As described in further detail below, relative poses of successive images (e.g., the target image $I_t$ 502 and the context image $I_c$ 504) of the monocular video and the depth-aware keypoints are matched based on nearest neighbor matching using the associated descriptors with a reciprocal check.

1.3 Pose Estimation from 3D Keypoints

As shown in FIG. 6, correspondences $p_t^\Phi \in I_t$ and $p_c^\Phi \in I_c$, are computed. Based on the computed correspondences $p_t^\Phi \in I_t$ and $p_c^\Phi \in I_c$, a robust estimator is used to compute the 6-DoF rigid body pose transformation $x_{t \to c}$ between the target and context views. In aspects of the present disclosure, pose estimation may be performed by lifting the 2D keypoints from the target image 3D with the associated depth Dt. For example, a perspective-n-point (PnP) process is used to compute an initial relative pose transformation $x^0_{t \to s} = (R_o t_o 01)$ to geometrically match the keypoints in the target image to those in the context image. Specifically, to reduce:

$$E_\psi(X_{t \to c}^0) = \| p_{t \to c}^0 - \pi(X_{t \to c}^0 \cdot P_t^\Phi) \|_2. \quad (1)$$

where $\pi(\cdot)$ is the standard pinhole camera projection model used to project the warped points $(R \cdot p_t^d + t)$ on to the context image $I_c$.

The estimated relative pose $x^0_{t \to c}$ may be obtained by reducing the residual error in Equation (1) using, for example, a Gaussian-Newton (GN) method with robustness to outliers. This step enables robust pose computation; however, this eliminates differentiable pose with respect to the 3D keypoints used for estimation. To alleviate this limitation, the resulting pose estimate can be used as an initial-guess to an end-to-end differentiable pose estimation module (e.g., 316) within the self-supervised 3D keypoint learning framework, as shown in FIG. 5.

According to aspects of the present disclosure, differentiable pose estimation from 3D keypoints is described based on frame-to-keyframe tracking. In this aspect of the present disclosure, calculating the re-projected context 3D keypoints $p_{t \to c}^\phi$ from the target keypoints $p_t^\phi$ via the initial pose estimate $x_{t \to c}^0 = (R_o, t_o 01)$, a 3D residual can be formulated to recover the pose in closed-form:

$$r(R,t) = \|p_s^d - R \cdot p_t^d + t\|_2, \text{ where } p_t^d = \pi^{-1}(p_t, D_t(p_t)), p_s^d = \pi^{-1}(p_s, d_s), d_s = [R_o \cdot p_t^d + t_0]_z \quad (2)$$

The 3D residual in Equation (2) can be effectively reduced by estimating the rotation and translation separately using a closed-form solution on an established inlier set. The rotation is first estimated by subtracting the means of the points and minimizing Equation 3 by solving singular value decomposition (SVD) in closed-form (e.g., the Orthogonal Procrustes problem:

$$E(\mathcal{R}) = P_c^* - R \cdot P_t^*\|_2, \text{ where } P_i^* = P_i - \overline{P}_i, \quad (3)$$

$$U\Sigma V = SVD(\Sigma(P_c^*)^T(P_t^*)), \text{ where } R = VU^T. \quad (4)$$

Once the rotation R is computed, the translation t can be directly recovered by minimizing:

$$t = p_c^* - \mathcal{R} \cdot P_t^*. \quad (5)$$

Thus, the gradients for the pose rotation and translation can be effectively propagated with respect to the lifted 3D keypoint locations, making the overall pose estimation fully-differentiable. The differentiable pose estimated using the 2D keypoints from the context image and 3D keypoints from the target image tightly couples keypoint and depth estimation. This allows further optimization of both predictions using an overall keypoint learning objective.

1.4 Keypoint Learning Objective

Aspects of the present disclosure are directed to self-supervised learning of depth-aware keypoints in a fully end-to-end differentiable manner using a combination of photometric and geometric losses. As shown in FIG. 5, both the KeypointNet 520 and the DepthNet 510 are jointly optimized using the following losses:

1.5 Keypoint Loss

The total keypoint loss is composed of three terms: $\mathcal{L}_{kpn} = \mathcal{L}_{geom} + \beta_1 \mathcal{L}_{desc} + \beta_2 \mathcal{L}_{score}$.

Geometric Loss. Using $X_{t \to c}$ and $P_t^\phi$, we compute the warped keypoints from image $I_t$ to $I_c$ as:

$$p_{t \to c}^\phi = \pi(X_{t \to c} P_t^\phi) = \pi(\mathcal{R} \cdot P_t^\phi + t) \quad (6)$$

Descriptor Loss. This aspect of the present disclosure uses nested hardest sample mining to self-supervise the keypoint descriptors between the context image $I_c$ 504 and the target image $I_t$ 502. Given anchor descriptors $f_t$ from the target image $I_t$ 502 and their associated positive descriptors in the $f_+ = f_t^{MV}$ in the context image $I_c$ 504, the triplet loss is defined as:

$$L_f = \sum_1 \max(0, \|f, f_+\|_2 - \|f, f_-\|_2 + m), \quad (7)$$

where $f_-$ is the hardest descriptor sample mined from $f_g$ with margin m.

Score Loss. In this example, score loss is introduced to identify reliable and repeatable keypoints in the matching process. In particular, aspects of the present disclosure ensure that (i) the feature-pairs have consistent scores across matching views; and (ii) the network learns to predict high scores for good keypoints with low geometric error and strong repeatability. For example, this objective is achieved by minimizing the squared distance between scores for each matched keypoint-pair, and minimizing or maximizing the average score of a matched keypoint-pair if the distance between the paired keypoints is greater or less than the average distance respectively:

$$\mathcal{L}_{score} = \left[ \frac{(s_t^\phi + s_c^\phi)}{2} \cdot (\|P_{t \to c}^\phi, p_c^\phi\|_2 - \overline{d}) + (s_t^\phi - s_c^\phi)^2 \right], \quad (8)$$

where $s_t^\phi$ and $s_c^\phi$ are the scores of the source and target frames respectively, and $\overline{d}$ is the average re-projection error of associated points in the current frame, given by $$\overline{d} = \frac{(s_t^\phi + s_c^\phi)}{2}.$$

by Here, d refers to the 2D Euclidean distance in feature space between L matching keypoints.

Photometric Loss In addition to the geometric losses, a dense photometric loss is used to learn dense depth in the DepthNet 510, for example, by warping the depth from the target image $I_t$ 502 from the depth map $D_t$ 512 along the predicted ego-motion estimate $x_{t \to c}$, to the context image $I_c$, 504. In addition, a structural similarity (SSIM) loss is imposed between the synthesized target image $I_t^*$ 542 and the original target image $I_t$. 502. The resulting dense photometric loss is regularized with an L1 pixel-wise loss term:

$$\mathcal{L}_{photo}(I_t, \hat{I}_t) = \gamma \frac{1 - SSIM(I_t, \hat{I}_t)}{2} + (1 - \gamma)|(I_t, \hat{I}_t)|. \quad (9)$$

To account for parallax errors and the presence of dynamic objects in videos, the pixel-wise minimum is computed between the set of synthesized context images $I_c \in I_C$ (e.g., context images) and the target image $I_t$ 502.

In addition, we mask out static pixels by removing those which have a warped photometric loss $\mathcal{L}_{photo}(I_t, \hat{I}_t)$ higher than their corresponding unwarped photometric loss $\mathcal{L}_{photo}(I_t, I_s)$, calculated using the original source image without view-synthesis. This has the effect of removing pixels with non-changing appearances, including static frames and dynamic objects with no relative motion.

Deep Smoothness Loss. In order to regularize the depth in texture-less low-image gradient regions, an edge-aware term is incorporated:

$$L_{sm} = |\delta_x D_t| e^{-|\delta_x I_t|} + |\delta_y \hat{D}_t| e^{-|\delta_y I_t|} \quad (10)$$

Depth Consistency. As described above, the depth regressed from the depth map $D_t$ 512 is scale-ambiguous. While recovering scale-consistent depth is not a strict specification for the proposed framework to learn 3D keypoints, scale-consistency is important for tasks that involve accurate ego-motion estimation. In this aspect of the present disclosure, a depth consistency term is incorporated to discourage scale-drift between dense depth predictions in adjacent frames:

$$\mathcal{L}_{const} = \frac{\|D_t(p_t^\phi) - D_c(p_t^\phi)\|}{D_t(p_t^\phi) + D_c(p_t^\phi)} \quad (11)$$

Note that $\mathcal{L}_c$ is a sparse loss defined based on the correspondences $p_t^\phi \leftrightarrow p_c^\phi$, $$\mathcal{L} = \mathcal{L}_{depth} + \alpha \mathcal{L}_{kpn} \quad (12)$$

$$\mathcal{L}_{kpn} = \mathcal{L}_{geom} + \beta_1 \mathcal{L}_{desc} + \beta_2 \mathcal{L}_{score}, \quad (13)$$

$$\mathcal{L}_{geom} = \|p_c^\phi - p_{t \to c}^\phi\|_2 \quad (14)$$

$$\mathcal{L}_{desc} = \max(0, \|f_* f_+\|_2 - \|f_* f_-\|_2 + m), \quad (15)$$

$$\mathcal{L}_{score} = \left[ \frac{s_t^\phi + s_c^\phi}{2} \cdot (\|(p_{t \to c}^\phi, p_c^\phi)\|_2 - \bar{d}) + (s_t^\phi - s_c^\phi)^2 \right], \quad (16)$$

where $\beta_1$, $\beta_2$, $\beta_3$, $\beta_4$, and $\gamma$ are weights used to balance the depth and keypoint losses and they are chosen as $\alpha=0.1$, $\beta_1 = \beta_2 = 1.0$, $\beta_3 = \beta_4 = 0.1$, and $\gamma = 0.85$, respectively, during the training.

According to aspects of the present disclosure, using the pair of the target image (e.g., $I_t$ 502) and the context image (e.g., $I_c$ 504), the losses noted above are computed. Additionally, homography adaptation (e.g., translation, rotation, scaling, cropping and symmetric perspective transformation, etc.) is performed starting from the target image (e.g., $I_t$ 502). Additionally, a per pixel Gaussian noise, color jitter, and Gaussian blur may be applied for additional robustness.

Figure 7:
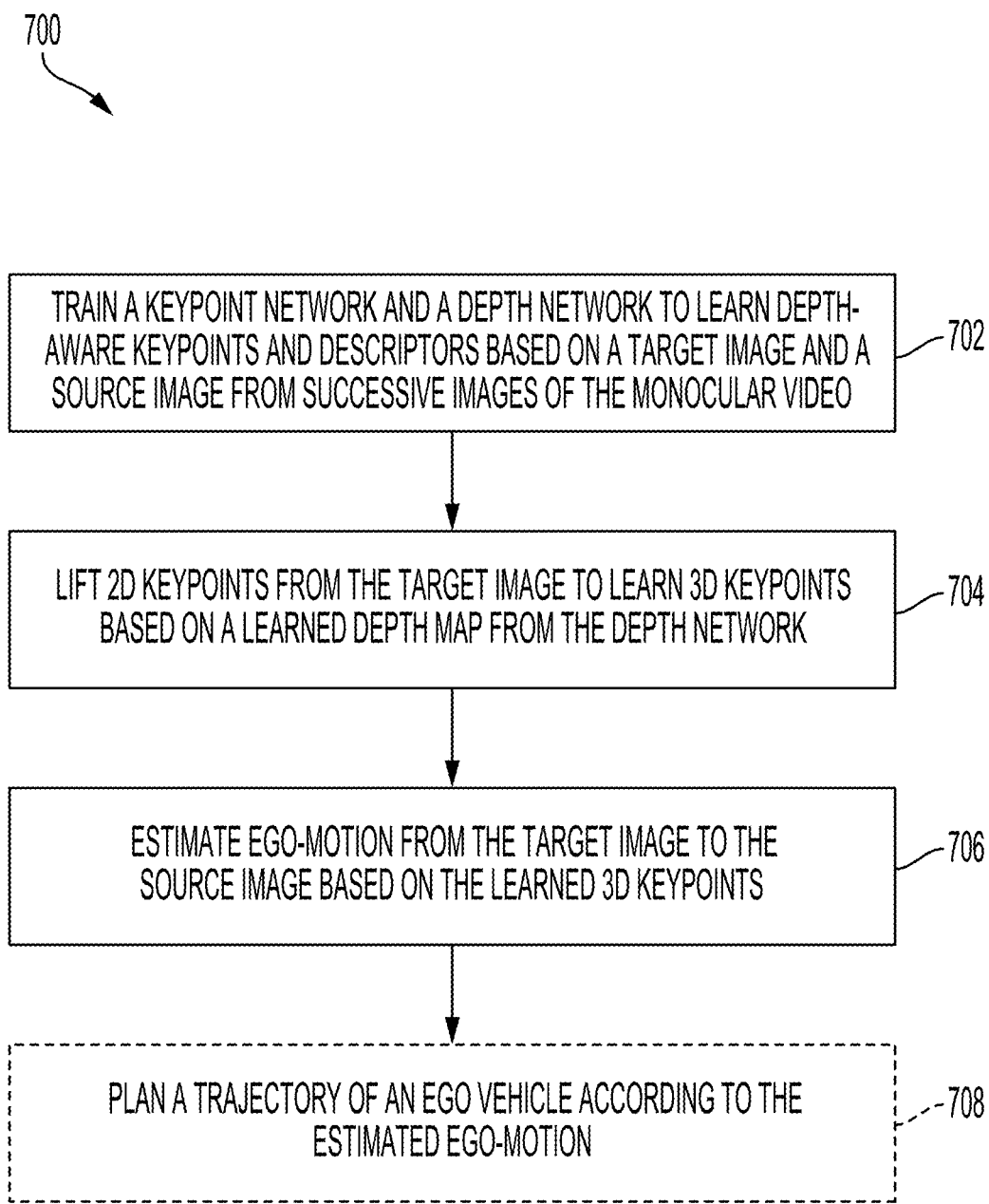
FIG. 7 is a flowchart illustrating a method for learning depth-aware keypoints and associated descriptors from monocular video for ego-motion estimation, according to aspects of the present disclosure.

FIG. 7 is a flowchart illustrating a method for learning depth-aware keypoints and associated descriptors from monocular video for ego-motion estimation, according to aspects of the present disclosure. The method 700 begins at block 702, in which a keypoint network and a depth network to learn depth-aware keypoints and descriptors based on a target image and a context image from successive images of the monocular video. For example, as shown in FIG. 5, a DepthNet 510 and a KeypointNet 520 are simultaneously trained in an end-to-end process using a combination of the photometric loss block 544, the geometric loss block 532, and the multi-view synthesis block 540. At block 704, 2D keypoints are lifted from the target image to learn 3D keypoints based on a learned depth map from the depth network. For example, as shown in FIG. 5, the depth map $D_t$ 512 enables lifting of 2D keypoints from the target image $I_t$ 502 to 3D keypoints by directly sampling from the predicted dense depth of the depth map $D_t$ 512. That is, sampling is performed from a predicted depth map (e.g., depth map $D_t$ 512) of the depth network (e.g., DepthNet 510) to lift sparse 2D keypoints to 3D keypoints.

At block 706, ego-motion is estimated from the target image to the context image based on the learned 3D keypoints. For example, as shown in FIG. 5, two consecutive images (e.g., the target image $I_t$ 502 and the context image $I_c$ 504) are used as input to self-supervise 3D keypoint learning using the ego-motion estimator 530. At block 708, a trajectory of an ego vehicle is planned according to estimated ego-motion, for example, as performed by the planner module 330 and/or the controller module 340 shown in FIG. 3. Ego vehicle perception using depth-aware 3D keypoints for monocular ego-motion estimation from a single camera of the car 350 is beneficially improved according to aspects of the present disclosure.

Aspect of the present disclosure are directed to a fully self-supervised framework for depth-aware keypoint learning from unlabeled monocular video. This aspect of the present disclosure incorporates a novel differentiable pose estimation module that simultaneously optimizes the keypoints and their depths in a structure-from-motion setting. In addition, a multi-view adaptation is performed to exploit the temporal context in videos to further boost the repeatability and matching performance of a keypoint network. The resulting 3D key-points and associated descriptors exhibit superior performance compared to all other traditional and learned methods, while learning from realistic non-planar 3D scenes. This self-supervised framework can be integrated with a monocular visual odometry system to achieve accurate, scale-aware, long-term tracking results which are on par with state-of-the-art stereo-methods.

In some aspects of the present disclosure, the method 700 may be performed by the SOC 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for learning depth-aware keypoints and associated descriptors from monocular video, comprising:
   training a keypoint network and a depth network to learn the depth-aware keypoints and the associated descriptors based on a target image and a context image from successive images of the monocular video;
   lifting 2D keypoints from the target image to learn first 3D keypoints of the target image based on a learned depth map of the target image from the depth network;
   estimating a pose transformation from the target image to the context image based on the first 3D keypoints of the target image to geometrically match the first 3D keypoints in the target image to the first 3D keypoints in the context image;
   computing second 3D keypoints of the target image based on an associated ego-motion computed between the target image and the context image according to the first 3D keypoints of the target image and the first 3D keypoints of the context image;
   estimating ego-motion of an autonomous ego vehicle from the target image to the context image captured by the autonomous ego vehicle based on the second 3D keypoints in the target image and the first 3D keypoints in the context image; and
   planning a trajectory of the autonomous ego vehicle according to the estimated ego-motion of the autonomous ego vehicle.

2. The method of claim 1, in which training comprises self-supervised learning of the depth-aware keypoints based on the target image and the context image from the successive images of the monocular video without any additional source of information.

3. The method of claim 1, in which training comprises training a differentiable pose estimation module based on sparse keypoint data to enable simultaneous training of the depth network and the keypoint network.

4. The method of claim 1, in which lifting comprises sampling from a predicted depth map of the depth network to lift sparse ones of the 2D keypoints to the first 3D keypoints.

5. The method of claim 1, in which relative poses of the successive images of the monocular video and the first 3D keypoints are matched based on nearest neighbor matching using the associated descriptors with a reciprocal check.

6. The method of claim 1, further comprising:
   determining the first 3D keypoints from the target image; and
   computing warped 3D keypoints in the context image corresponding to the determined first 3D keypoints from the target image according to a nearest keypoint in the target image.

7. A non-transitory computer-readable medium having program code recorded thereon for learning depth-aware keypoints and associated descriptors from monocular video, the program code being executed by a processor and comprising:
   program code to train a keypoint network and a depth network to learn the depth-aware keypoints and the associated descriptors based on a target image and a context image from successive images of the monocular video;
   program code to lift 2D keypoints from the target image to learn first 3D keypoints of the target image based on a learned depth map of the target image from the depth network;
   program code to estimate a pose transformation from the target image to the context image based on the first 3D keypoints of the target image to geometrically match the first 3D keypoints in the target image to first 3D keypoints in the context image;
   program code to compute second 3D keypoints of the target image based on an associated ego-motion computed between the target image and the context image according to the first 3D keypoints of the target image and the first 3D keypoints of the context image;
   program code to estimate ego-motion of an ego vehicle from the target image to the context image captured by the ego vehicle based on the second 3D keypoints in the target image and the first 3D keypoints in the context image; and
   program code to plan a trajectory of the ego vehicle according to the estimated ego-motion of the ego vehicle.

8. The non-transitory computer-readable medium of claim 7, in which the program code to train comprises program code to self-supervised learning of the depth-aware keypoints based on the target image and the context image from the successive images of the monocular video without any additional source of information.

9. The non-transitory computer-readable medium of claim 7, in which the program code to train comprises program code to train a differentiable pose estimation module based on sparse keypoint data to enable simultaneous training of the depth network and the keypoint network.

10. The non-transitory computer-readable medium of claim 7, in which the program code to lift comprises sampling from a predicted depth map of the depth network to lift sparse ones of the 2D keypoints to the first 3D keypoints.

11. The non-transitory computer-readable medium of claim 7, in which relative poses of the successive images of the monocular video and the first 3D keypoints are matched based on nearest neighbor matching using the associated descriptors with a reciprocal check.

12. The non-transitory computer-readable medium of claim 7, further comprising:
   program code to determine the first 3D keypoints from the target image; and
   program code to compute warped 3D keypoints in the context image corresponding to the determined first 3D keypoints from the target image according to a nearest keypoint in the target image.

13. A system for learning depth-aware keypoints and associated descriptors from monocular video, the system comprising:
   a depth-aware keypoint model trained to learn a keypoint network and a depth network, and trained to learn the depth-aware keypoints and the associated descriptors based on a target image and a context image from successive images of the monocular video;
   a keypoint lifting module to lift 2D keypoints from the target image to learn first 3D keypoints of the target image based on a learned depth map of the target image from the depth network;
   a pose estimation module to estimate a pose transformation from the target image to the context image based on the first 3D keypoints of the target image to geometrically match the first 3D keypoints in the target image to first 3D keypoints in the context image and to compute second 3D keypoints of the target image based on an associated ego-motion computed between the target image and the context image according to the first 3D keypoints of the target image and the first 3D keypoints of the context image;
   an ego-motion estimation module to estimate ego-motion of an ego vehicle from a target image to a context image captured by the ego vehicle based on the second 3D keypoints in the target image and the first 3D keypoints in the context image; and
   a planner module to plan a trajectory of the ego vehicle according to the estimated ego-motion of the ego vehicle.

14. The system of claim 13, in which the pose estimation module provides differentiable pose estimation based on sparse keypoint data to enable simultaneous training of the depth network and the keypoint network.

15. The system of claim 13, in which the keypoint lifting module is trained to lift by sampling from a predicted depth map of the depth network to lift sparse ones of the 2D keypoints to the first 3D keypoints.

* * * * *